United States Patent

Smith

[11] 3,959,057
[45] May 25, 1976

[54] MEANS AND METHOD FOR PRODUCING PLASTIC NETTING

[76] Inventor: Jesse J. Smith, P.O. Box 162, Garden City, Kans. 67846

[22] Filed: Apr. 7, 1975

[21] Appl. No.: 565,691

[52] U.S. Cl. ............................... 156/244; 156/500; 264/167; 425/72 S; 425/133.1; 425/382 N; 425/464
[51] Int. Cl.² ......................................... B29B 5/04
[58] Field of Search .......... 156/244, 285, 296, 433, 156/497, 500; 264/88, 93, 167, 171, 174, 176 R, 176 F, 177 R, 210 R, 210 F; 425/72, 113, 114, 133.1, 382 R, 382 N, 463, 464

[56] References Cited
UNITED STATES PATENTS

| | | | |
|---|---|---|---|
| 3,308,220 | 3/1967 | Smith | 156/244 |
| 3,538,545 | 11/1970 | Smith | 264/167 |
| 3,551,236 | 12/1970 | Fairbanks | 425/72 |
| 3,737,508 | 6/1973 | Weir | 425/72 |
| 3,814,559 | 6/1974 | Akers et al. | 425/72 |

Primary Examiner—Caleb Weston

[57] ABSTRACT

A means and method for producing plastic netting wherein a hot pneumatic fluid such as nitrogen is used to blow filaments of one circular row of plastic filaments into contact with another circular row of plastic filaments which rows are concentric with each other and being rotated in opposite directions by a respective pair of counter-rotating dies. The hot pneumatic fluid is preferably an inert gas such as nitrogen and serves to anneal the plastic at the weld intersections of the filaments as well as to prevent oxidation during the period when the filaments are quite hot. The means disclosed herein comprises a pair of concentric relatively rotatable dies each having a circular row of plastic extrusion orifices, the dies being adapted to rotate in opposite directions and the rows of orifices being in close proximity to each other and means for projecting hot pneumatic fluid is carried by one of the dies and the hot pneumatic fluid is directed to filaments extruded from a circular row of orifices of the same die which carries the means for projecting the hot pneumatic fluid toward the extruded plastic filaments. Additionally, the individual plastic extrusion orifices are generally aligned axially with individual jet openings through which the hot pneumatic fluid is directed laterally against the filaments of one of said circular rows so that such filaments are blown into weld contact with the plastic filaments extruded from the other circular row of extrusion orifices carried by the other die.

11 Claims, 4 Drawing Figures

MEANS AND METHOD FOR PRODUCING PLASTIC NETTING

BACKGROUND OF THE INVENTION

U.S. Pat. Nos. 3,308,220 and 3,538,545, these patents being representative of the prior art wherein counter-rotating dies each carry a circular row of plastic extrusion orifices in close proximity to each other and in most of these prior art patents the orifices are disposed at an angle to each other so that the filaments extruded from one circular row of orifices impinge upon the filaments being extruded from the other row of orifices while the rows are rotated in counter-rotation relative to each other about a common rotary axis. In U.S. Pat. No. 3,538,545 some of the plastic filaments are caused to expand laterally into contact with the filaments extruded from an adjacent die. All of these prior art methods including many of the methods and devices disclosed in the foregoing patents as well as in the art cited thereagainst extrude the hot plastic filaments into welded relationship with each other in the atmosphere and oxidation as well as embrittlement occurs at the weld intersections which generally reduces the strength of the plastic netting so produced. Consequently, netting produced by prior art means and method may require the use of more plastic due to the fact that the filaments must be made of a greater cross sectional area in order to compensate for the effects of oxygen in the atmosphere and also from embrittlement which imposes an insipient failure at each weld area depending upon the relative stress and relative cross section of the filaments.

SUMMARY OF THE INVENTION

The present invention relates to a means and method for producing plastic netting and particularly plastic netting which is substantially cylindrical in form and adapted for fabricating plastic bags or the like. The means and method of the present invention relates to the concurrent extrusion of concentric rows of plastic filaments with the rows counter-rotating about a common axis and the use of a hot pneumatic fluid for blowing the filaments of one row into contact with the filaments of the other row, the fluid preferably being an inert fluid which does not react with the chemistry of the plastic filaments and the hot pneumatic fluid is preferably nitrogen gas.

While the concentric circular rows of orifices extrude plastic filaments therefrom, these rows are carried in separate dies which rotate in opposite directions with each other so that the filaments of each row are distributed in a helical pattern and cross the filaments of the other row and the hot pneumatic fluid, according to the present invention, forces one row of filaments to move laterally into weld contact with the other row of filaments at a crossed or helical relationship thereto. The use of hot nitrogen in blowing the filaments of one row against the filaments of the other row tends to anneal the plastic weld so formed and to shield or envelop the weld areas in an inert atmosphere excluding oxygen and substantially reducing the tendency of the welds to oxidize during the actual welding or fusing operation. The means of the invention comprises a pair of rotary dies rotatable on a common axis and in opposite directions to each other and concentric with each other and each die having a concentric circular row of plastic extruding orifices and these rows being close enough together so that the hot pneumatic fluid may readily blow the filaments of one row against the filaments of the other row as they are extruded in closely adjacent relationship to each other. The die which carries the means for projecting pneumatic fluid under pressure includes a plurality of jet orifices and these jet orifices are aligned with respective plastic extrusion orifices carried by the same die so that the hot pneumatic fluid jet orifices are always aligned with the filaments being extruded from one of the circular rows of the respective set of dies and thus jet orifices carried by one die always project directly against filaments which are extruded from orifices aligned with the jet orifices and this combination is generally carried by the central die with the other die rotating around it so that the inner circular row of plastic filaments is blown against the outer row of plastic filaments carried by the other die. It will be understood, however, that the hot pneumatic fluid may be carried by the outermost die and directed inwardly toward the axis of rotation so as to blow the plastic filaments of the outer circular row against those of the inner circular row carried by the other die.

Accordingly, it is an object of the invention to provide a new and improved means and method for producing plastic netting.

Another object of the invention is to provide a means and method by which plastic netting may be manufactured with weld areas at the intersections of the filament of stronger character due to the fact that the weld areas are annealed and protected from the effects of atmosphere in the oxygen thus the welds are relatively stronger due to the fact that embrittlement or oxidation does not occur substantially as in prior art methods.

Another object of the invention is to provide a means and method for producing plastic netting which is firmly and chemically efficient so as to produce netting having stronger weld intersections and thereby permit a reduction in the use of plastic material due to the increased strength in the weld intersections so that initially the filament size of the extruded plastic may be smaller and thereby save plastic for making a given netting bag size.

Another object of the invention is to provide a novel means whereby pneumatic fluid under pressure is used to blow hot extruded plastic filaments laterally of their axis into weld contact with other plastic filaments extruded in close proximity thereto.

Further object and advantages of the invention may be apparent from the following specification, appended claims and accompanying drawings.

DESCRIPTION OF THE PREFERRED EMBODIMENTS

Figure 1:
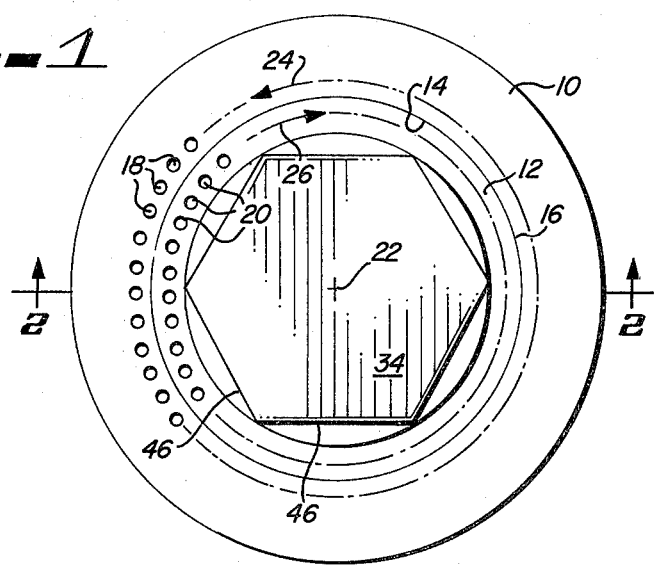
FIG. 1 is a view of the delivery end of plastic filament extruding dies.

As shown in the drawings, the means used in connection with the method of the invention comprises a pair of generally circular dies 10 and 12; the die 10 having a bore 14 in which the die 12 at its periphery 16 rotates.

The die 10 is provided with a circular row of plastic extrusion orifices 18 near the bore 16 and the die 12 is provided with a circular row of plastic extrusion orifices 20 which are in close proximity to the circular row of plastic extrusion orifices 18 of the die 10.

Figure 2:
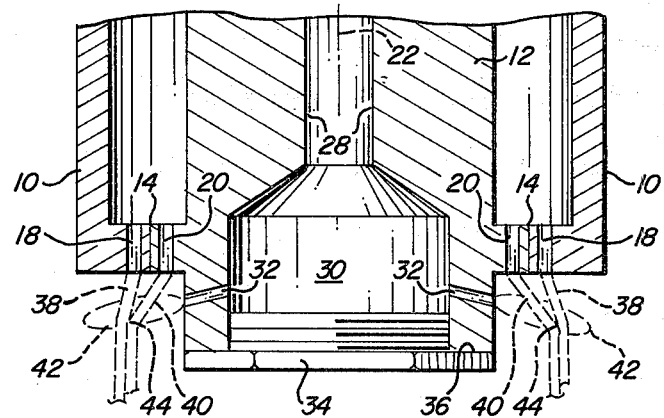
FIG. 2 is an axial sectional view taken from the line 2—2 of FIG. 1.
Figure 3:
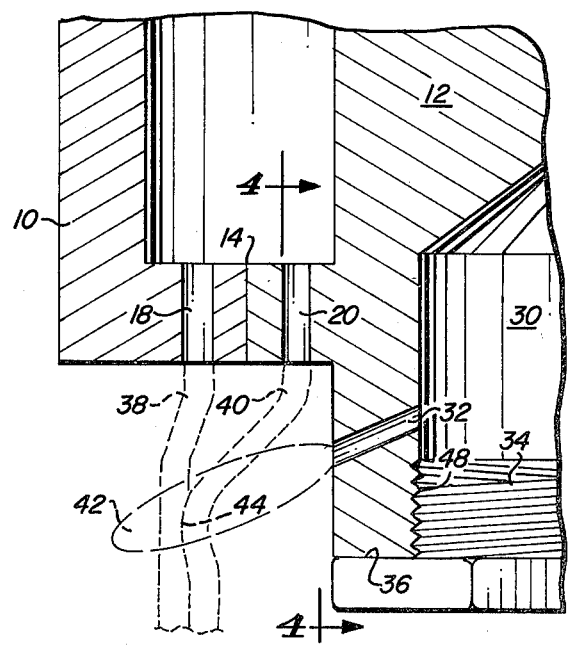
FIG. 3 is an enlarged fragmentary sectional view taken on the same plane as FIG. 2.

Referring to FIG. 2 of the drawings, it will be seen that the bore 14 is disposed between the row of orifices 18 and the row of orifices 20.

As shown, the circular rows of orifices 18 and 20 rotate about a common concentric axis 22 and thus the rows of orifices 18 and 20 are circular and concentric relative to each other and the dies 10 and 12 operate in the directions of the arrows 24 and 26 respectively thus these dies are counter-rotating and operate in a similar manner to those disclosed in the hereinbefore referenced prior art.

Figure 4:
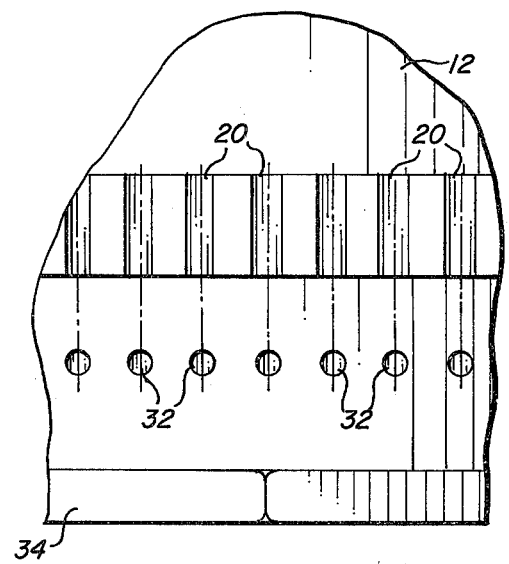
FIG. 4 is a fragmentary sectional view taken from the line 4—4 of FIG. 3.

The die 12 is provided with a central bore 28 communicating with a distributor cavity 30. This distributor cavity 30 is provided with an annular row of jet orifices 32 which are directed laterally relative to the orifices 20 and as shown in FIG. 4 are axially aligned therewith. Thus each hot gas jet orifice 32 aligns with a respective plastic extrusion orifice 20 and the orifices 20 and 32 are carried by the same die, namely, the die 12 so that they rotate together. The cavity 30 is enclosed by a screw threaded cap 34 at the normally extended end 36 of the die 10.

As shown by broken lines filaments 38 are extruded from the orifices 18 and filaments 40 are extruded from the orifices 20. These are plastic filaments so that the plastic filaments 38 and 40 are initially extruded substantially parallel with each other and the hot gas, such as hot nitrogen gas, projected under pressure outwardly through the jet orifices 32 as indicated by broken lines 42 blow the filaments 40 against the filaments 38 as the dies counter-rotate so that plastic mesh is formed by the hot gas jet 42 from each orifice 32 forcing a respective filament 40 into welding contact with a respective filament 38. The hot pneumatic fluid is preferably nitrogen or any other suitable inert gas depending upon the chemistry of the plastic filaments 38 and 40 and inasmuch as the gas is hot it tends to anneal the weld intersections which are generally designated 44. At the same time the inert gas protects these weld intersections from the effects of oxygen in the atmosphere.

As shown in FIG. 1, the cap 34 is provided with wrench engaging flats 46, these flats being disposed in hexagonal form so as to be able to tighten the cap 34 at its screw threaded connection 48 in the chamber 30.

It will be appreciated that the use of nitrogen or other inert gas with the nitrogen in relatively hot condition causes annealing of the weld areas 44 at the intersections of the plastic filaments and also excludes oxygen therefrom so that embrittlement from thermal reaction as well as oxidation is avoided and thus the weld areas 44 are strengthened relative to the usual method wherein the impingement welding occurs in the open atmosphere.

The invention method provides a novel manner of causing weld intersections of plastic filaments extruded from circular rows of filaments rotated In the opposite direction to each other in that the pneumatic fluid under pressure blows the filaments of one circular row into contact with the other row and also heats the filaments and causes an efficient weld.

It will be obvious to those skilled in the art that various modifications may be resorted to without departing from the spirit of the invention.

I claim:

1. A method for producing plastic netting comprising: concurrently rotating a pair of concentric plastic extruding dies in opposite directions about a common axis; extruding hot plastic filaments from first and second adjacent concentric circular rows of plastic extrusion orifices; said first row being in one of said dies and said second row being in the other of said dies; said concentric row of orifices being in close proximity to each other; and subjecting the filaments passing from said first circular row to hot pneumatic fluid under pressure and thus blowing and forcing said filaments from said first circular row into fusion contact with the filaments extruded from said second circular row to thereby cause fusion welding of said filaments from said first and second rows together by said hot pneumatic fluid.

2. The invention as defined in claim 1, wherein: said hot pneumatic fluid is nitrogen gas.

3. The invention as defined in claim 1, wherein: said hot pneumatic fluid is chemically substantially inert relative to said plastic.

4. The invention as defined in claim 3, wherein: said hot pneumatic fluid is nitrogen gas.

5. The invention as defined in claim 1, wherein: said hot pneumatic fluid causes annealing of the hot weld intersections of said filaments to attain maximum strength thereof.

6. The invention as defined in claim 5, wherein: said hot pneumatic fluid is inert chemically relative to the plastic of said filaments to thereby effectively inhibit oxidation of said plastic filaments at their weld intersections.

7. A means for producing plastic netting comprising a pair of concentric extruding dies rotatable relative to each other and operable in opposite rotary directions about a common axis relative to each other; one of said dies having a circular row of plastic extrusion orifices concentric with the rotary axis of said dies; the other of said dies provided with a second concentric circular row of plastic extrusion orifices which are concentric with said first row of plastic extrusion orifices; means in one of said dies for projecting pneumatic fluid under pressure for blowing and forcing said filaments from said first circular row of orifices into fusion contact with the filaments being extruded from the second circular row of extrusion orifices to cause fusion welding of the filaments extruded from one row with the filaments extruded from the other row.

8. The invention as defined in claim 7, wherein: all of said plastic extrusion orifices of said circular rows being substantially parallel to each other and substantially parallel to the axis of rotation of said dies.

9. The invention as defined in claim 8, wherein: jet orifices are carried by one of said dies and directed laterally of the axis of said filaments of one of said rows and in a direction to force the filaments from the last mentioned row into welding contact with the filaments of the other row of plastic extruding orifices in the other die.

10. The invention as defined in claim 9, wherein: said jet orifices being individual orifices and having jet axis aligned with respective individual plastic extrusion orifices of one of said rows.

11. The invention as defined in claim 10, wherein: said jet orifices are carried by the same die which carries one of said circular rows of plastic extrusion orifices with which said jet orifices are aligned so that said filaments extruded from one of said circular rows are always positively blown against the filaments extruded from the other of said rows.

* * * * *